United States Patent
Im et al.

(10) Patent No.: US 7,978,421 B2
(45) Date of Patent: Jul. 12, 2011

(54) CAMERA MODULE

(75) Inventors: Jang Young Im, Gyunggi-do (KR); Jun Asaga, Gyunggi-do (KR); Seong Ho Kang, Gyunnggi-do (KR); Oh Byoung Kwon, Gyunggi-do (KR); Young Bok Yoon, Gyunggi-do (KR)

(73) Assignee: Samsung Electro Mechanics Co., Ltd., Suwon (KR)

( * ) Notice: Subject to any disclaimer, the term of this patent is extended or adjusted under 35 U.S.C. 154(b) by 89 days.

(21) Appl. No.: 12/385,457

(22) Filed: Apr. 8, 2009

(65) Prior Publication Data
US 2010/0157450 A1 Jun. 24, 2010

(30) Foreign Application Priority Data
Dec. 19, 2008 (KR) .................. 10-2008-0130335

(51) Int. Cl.
*G02B 15/14* (2006.01)
(52) U.S. Cl. ...................................... 359/694
(58) Field of Classification Search .................. 359/694, 359/821–824; 396/79, 85, 529; 348/345, 348/374, 376
See application file for complete search history.

(56) References Cited

U.S. PATENT DOCUMENTS
7,158,316 B2 * 1/2007 Chang et al. .................. 359/698

FOREIGN PATENT DOCUMENTS
JP 2007-298551 11/2007
KR 10-2008-0039239 5/2008
WO WO2005/041562 5/2005

OTHER PUBLICATIONS

Japanese Office Action for corresponding Japanese Patent Application No. 2009-082176 dated Nov. 24, 2010.

* cited by examiner

*Primary Examiner* — Joseph Martinez

(57) ABSTRACT

Disclosed is a camera module with a hinge spring which can stably support a lens barrel which is driven in a vertical direction for automatic focusing and which is made of lightweight resin, the camera module including a cylindrical lens barrel with lenses disposed therein for collecting images of external objects, a housing encasing the lens barrel in a manner such that the lens barrel vertically moves in an optical axis direction of the lenses, an automatic focusing actuator installed in the housing to cause linear motion of the lens barrel in the optical axis direction, and a ring-shaped hinge spring extrusion-molded using resin having elasticity to support an upper portion of the lens barrel and guide the linear motion of the lens barrel.

10 Claims, 6 Drawing Sheets

CAMERA MODULE

CROSS REFERENCE TO RELATED APPLICATION(S)

This application claims the benefit of Korean Patent Application No. 10-2008-0130335, filed on Dec. 19, 2008, entitled CAMERA MODULE, which is hereby incorporated by reference in its entirety into this application.

BACKGROUND OF THE INVENTION

1. Field of the Invention

The present invention relates to a camera module for a mobile apparatus, and more particularly to a camera module with a hinge spring which can more stably support a lens barrel moving in a vertical direction for image focusing and is molded using a lightweight and elastic resin.

2. Description of the Related Art

Recently, mobile apparatuses, such as cellular phones and notebook computers, are generally equipped with camera modules in which imaging devices, such as charge coupled device (CCD) image sensors and complementary metal oxide semiconductor (CMOS) image sensors, are mounted. As such camera modules provided in the mobile apparatuses have come to have higher pixels and performance, mobile apparatuses have gained a high-quality camera function, enabling them to compete with high-end digital cameras. The camera module of the mobile apparatus generally uses a voice coil motor (VCM) actuator or a Piezo actuator for image focusing.

In the VCM actuator, automatic focusing is performed by moving a lens barrel equipped with lenses in a vertical direction by electromagnetic force generated by reciprocal actions between a magnetic field of a permanent magnet and an electric field generated by current flowing through a coil. On the other hand, in the Piezo actuator, the automatic focusing is performed by moving a lens barrel in a vertical direction by Piezo elements vibrating with predetermined amplitude when current is applied. An example of the camera module with such an automatic focusing actuator is disclosed in KR 10-2008-0039239 published on May 7, 2008 (see FIG. 1 and FIG. 2), and such known lens actuators are shown in FIG. 6 and FIG. 7 of this specification.

As shown in FIG. 6 and FIG. 7, in the known lens actuator disclosed in KR 10-2008-0039239, a carrier 11 having lenses therein is supported by two leaf springs 14 and 15 so that the carrier 11 can move in an optical axis direction.

That is, in the known lens actuator, the carrier 11 is elastically supported by upper and lower leaf springs 14 and 15 which are thin metal plate members made of steel or copper alloy so that the carrier 11 can move up and down in an optical axis direction thanks to magnet and coil. Accordingly, the carrier 11 is disposed at a predetermined position in a casing 13.

However, the known lens actuator having the above-mentioned structure is disadvantageous in that it needs to be manufactured using a thin leaf spring of a metal so that the carrier can move in a vertical direction. However, it is difficult to manufacture the leaf spring having a shape shown in FIG. 7. That is, when manufacturing the leaf spring by press-processing metal, it is difficult to precisely process a portion of the leaf spring, which is likely to deform owing to the movement of the carrier, and therefore the leaf springs may have variance in their elasticity.

Further, since the leaf springs are made of a metal, the known lens actuator is expensive, the number of manufacturing processes is large, and the manufacturing time is long.

SUMMARY OF THE INVENTION

The invention is made in view of the aforementioned problems, and an object of the invention is to provide a camera module in which a hinge spring, which elastically supports a lens barrel, is manufactured through an extrusion-molding process using an elastic resin which is relatively easy to process with relatively high precision relative to that of metal in order to decrease manufacturing cost, time, and the number of manufacturing processes.

In order to accomplish such an object, according to one aspect of the invention there is provided a camera module including a cylindrical lens barrel in which lenses for collecting images are provided, a housing which encases the lens barrel in a manner such that the lens barrel can move in a vertical direction, an automatic focusing actuator installed in the housing to linearly drive the lens barrel in an optical axis direction, and a ring-shaped hinge spring which is extrusion-molded using resin having elasticity and which supports an upper portion of the lens barrel to guide linear motion of the lens barrel.

It is preferable that the hinge spring have a shape in which a portion which elastically deforms when the lens barrel vertically moves is relatively thin compared to other portions.

It is preferable that the hinge spring include a plurality of frame portions arranged in a ring shape, two barrel-coupling portions for coupling the hinge spring to the lens barrel, two housing-couplings for coupling the hinge spring to the housing, and an elastically deformable portion which connects the frame portions to the barrel-coupling portions or the housing-coupling portions and deforms when the lens barrel vertically moves, as it has a smaller thickness than the frame portions.

It is preferable that the barrel-coupling portions be integrally formed with protrusions, respectively, which are inserted into and fixed to the lens barrel.

It is preferable that the lens barrel have two coupling protrusions which are disposed apart from each other in a manner of protruding from the outer surface of the lens barrel and which have grooves, respectively, so that protrusions of the housing are inserted into the grooves.

It is preferable that the barrel-coupling portions coupled to the lens barrel vertically move in a parallel direction with the optical axis and that the elastically deformable portion cause flexural or twisting deformation when the lens barrel vertically moves.

According to the aspect of the invention, since the spring of the camera module is manufactured by a single instance of extrusion molding, using resin having predetermined elasticity, it is possible to manufacture the spring within a shorter manufacturing time and with a smaller number of manufacturing processes than leaf springs. Further, it is possible to realize a lightweight camera module by using the hinge spring made of resin which is lightweight, instead of metal leaf springs.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
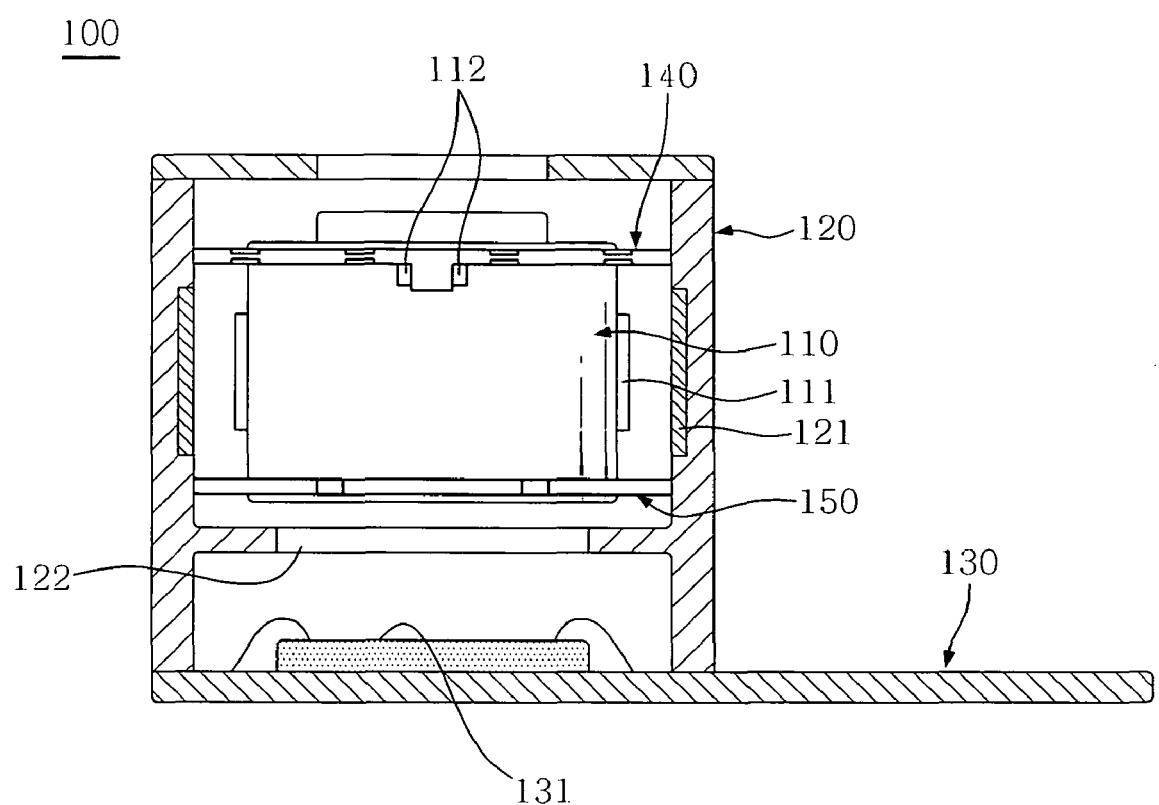
FIG. 1 is a schematic cross-sectional view illustrating a camera module according to one embodiment of the invention.

Reference will now be made in greater detail to exemplary embodiments of the invention, an example of which is illustrated in the accompanying drawings. Wherever possible, the same reference numerals will be used throughout the drawings and the description to refer to the same or like parts.

Hereinafter, a camera module according to one embodiment of the invention will be described with reference to the accompanying drawings.

As shown in FIGS. 1 to 5, a camera module 100 according to one embodiment of the invention includes a lens barrel 110, a housing 120, a circuit board 130, hinge springs 140, and a film suspension 150.

The lens barrel 110 is a unit for transferring an image of an external object outside a camera module to an image sensor 131 disposed inside the camera module 100 using a plurality of lenses provided therein. The lens barrel 100 has a stack of lenses therein and a plurality of coils 111, each composed of plural windings, on the outer surface thereof.

The coils 111 are installed on the surface of the lens barrel 110 so as to face permanent magnets 121 coupled to a housing 120. The lens barrel 110 linearly move in a vertical direction by electromagnetic force generated by electric field generated by current flowing through the coils 111 and magnetic field of the permanent magnets 121.

Figure 2:
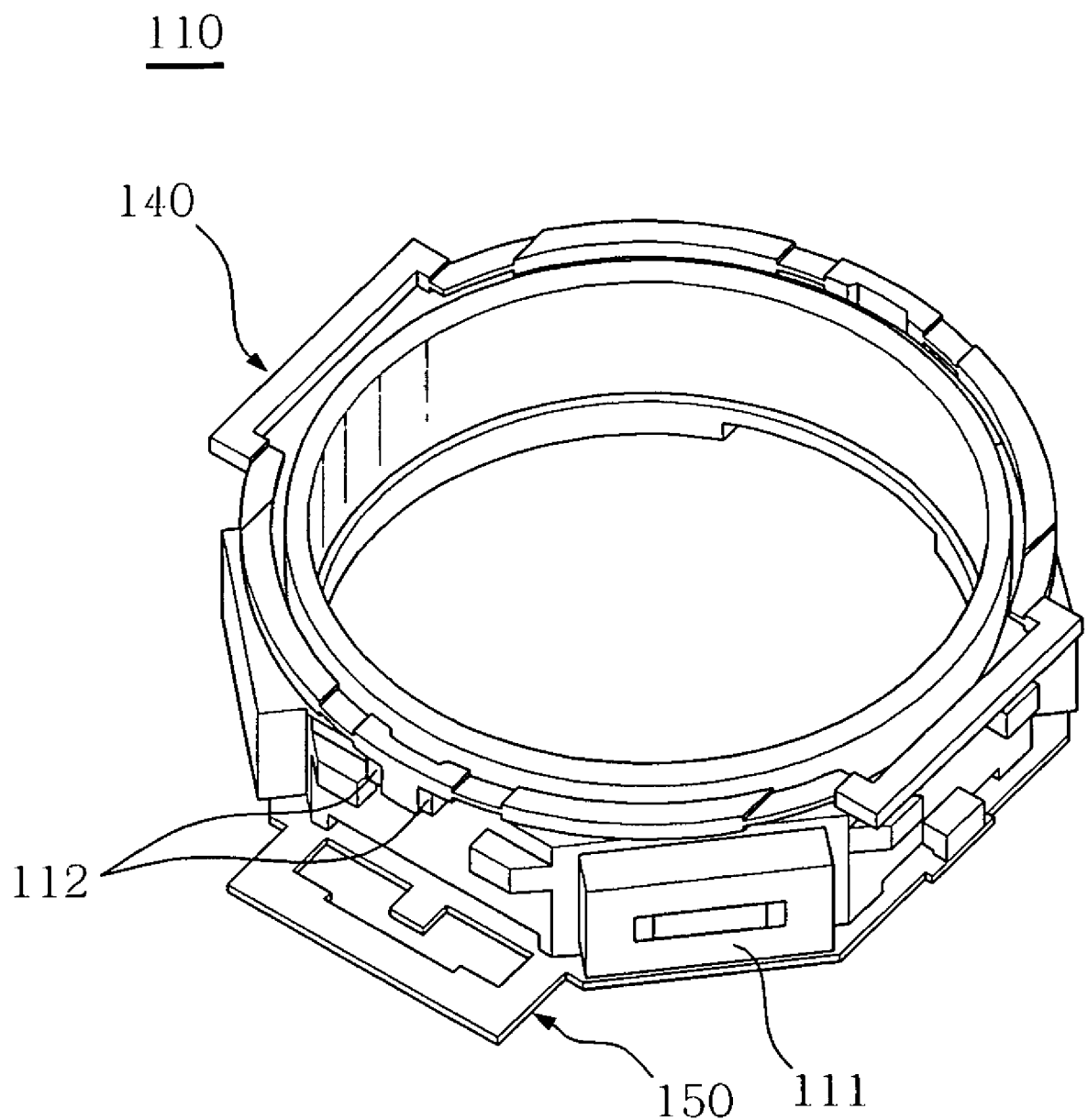
FIG. 2 is a schematic perspective view illustrating a lens barrel of FIG. 1.
Figure 3:
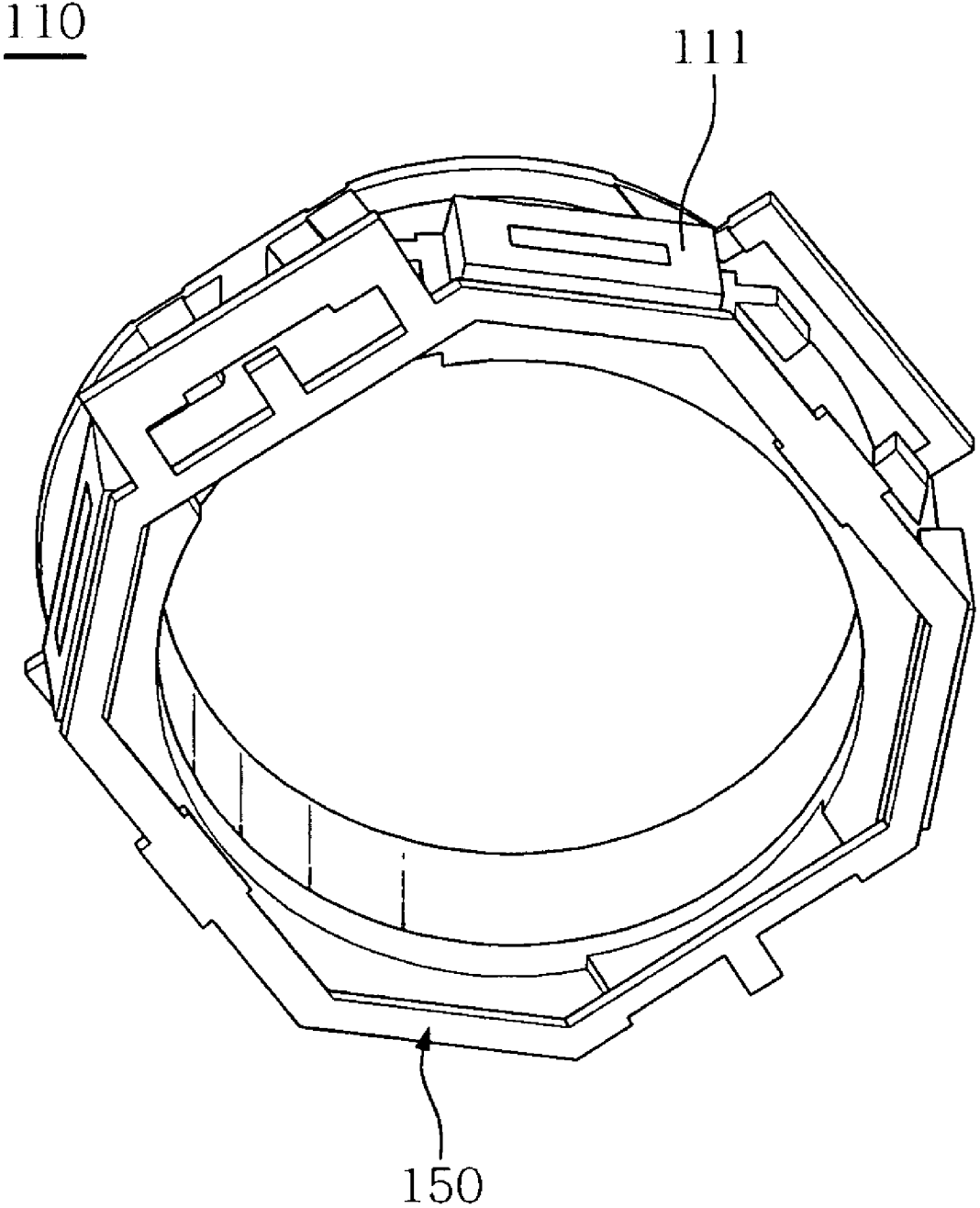
FIG. 3 is a bottom perspective view illustrating the lens barrel of FIG. 1.

Coupling protrusions 112, to which the hinge springs 140 are coupled, are disposed on the outer surface of the lens barrel 110 in a manner of facing each other. Each of the coupling protrusions 112 has a rectangular parallelepiped shape and the hinge springs 140 are inserted into and coupled to the coupling protrusions 112 so that the hinge springs 149 are fixed. As shown in FIG. 2, two coupling protrusions 112 are provided on the outer wall surfaces of the lens barrel 110 which face each other.

The housing 120 receives the lens barrel 110 therein. The permanent magnets 121 are fixed onto the inner surface of the housing 120 so as to face the coils 111 provided on the outer surface of the lens barrel 110. Further, a middle portion of the housing 120 is provided with an infrared (IR) filter 112 for filtering infrared rays. The hinge springs 140 are fixed and coupled to the inner surface of the housing 120.

The circuit board 130 is a unit for transferring an electrical signal from the image sensor 131 electrically connected thereto to a mobile apparatus, such as a camera phone, a personal digital assistant, or a notebook computer. Accordingly, the upper surface of the circuit board is provided with a circuit pattern formed by a printed circuit board manufacturing process.

The image sensor 131 is placed and fixed at a middle portion of the circuit board 130 and electrically connected to the circuit pattern formed on the circuit board 130 through a wire-bonding method.

The hinge springs 140 support the lens barrel 110 so that the lens barrel 110 can linearly move in an optical axis direction. According to a preferred embodiment of the invention, each of the hinge springs 140 has a ring shape as a whole and is formed through an extrusion molding process, using resin so that it has predetermined elasticity.

Figure 4:
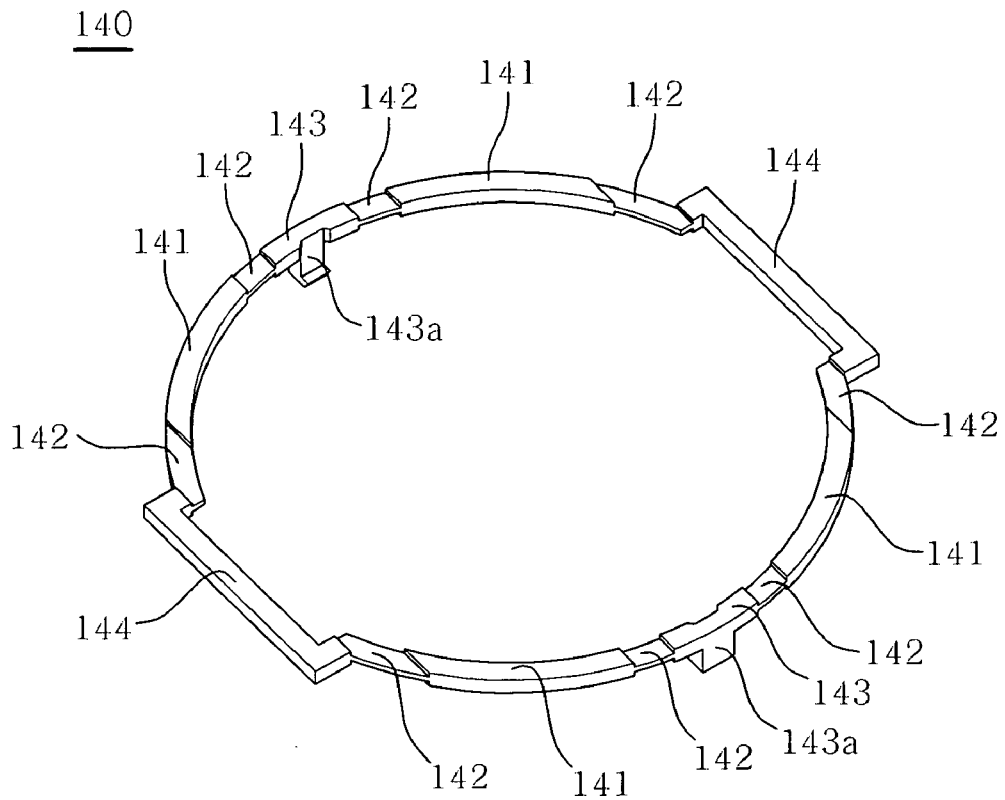
FIG. 4 is a schematic perspective view illustrating a hinge spring of FIG. 1.

As shown in FIG. 4, each of the hinge springs 140 includes frame portions 141, elastically deformable portions 142 connected between the frame portions 141, barrel-coupling portions 143 for coupling the hinge spring 140 to the lens barrel 110, and housing-coupling portions 144 for coupling the hinge spring 140 to the housing 120.

The frame portions 141 form a ring shape as a whole. The elastically deformable portions 142 are provided at portions of the frame portions 141 which couple the coupling portions 141 to the barrel-coupling portions 143 or the housing-coupling portions 144. It is preferable that the frame portions 141 support the lens barrel 110 in a state in which they are relatively thick in comparison with the elastically deformable portions 142. Accordingly, the frame portions 141 deform less than the elastically deformable portions 142 when the lens barrel 110 performs linear motion.

The elastically deformable portions 142 are units for coupling the frame portions 141 to the barrel-coupling portions 143 and the housing-coupling portions 144 and are relatively thin in comparison with the frame portions 141 so that they severely deform when the lens barrel 110 performs linear motion. Practically, as the elastically deformable portions 142 perform twisting deformations when the lens barrel 110 performs linear motion, they guide the linear motion of the lens barrel 110.

The barrel coupling portions 143 are units for coupling the hinge spring 140 to the coupling protrusions 112 of the lens barrel 110 and have protrusions 143a inserted into and coupled to grooves formed between a pair of coupling protrusions 112 formed on the lens barrel 110. The barrel coupling portions 143 are in a pair and face each other. The barrel coupling portions 143 are fixed and coupled to the coupling protrusions 112 formed on the surface of the lens barrel 110.

The housing coupling portions 144 are units for coupling the hinge spring 140 to the housing 120 and preferably have a relatively large coupling area in order to increase coupling force between the housing 120 and itself. According to the embodiment, the housing coupling portions 144 have a letter "C" shape.

To describe the hinge spring 140 in more detail, portions of the hinge springs 140 are separately named. However, each of the hinge springs 140 is formed into a single body through an extrusion molding process using resin having predetermined elasticity. The extrusion molding using resin is advantageous in that it generally has less process difficulty than metal plate molding of a conventional technology and it decreases the process time and number of manufacturing processes.

The film suspension 150 is provided at a lower portion of the lens barrel 110 and guides vertical linear motion of the lens barrel 110. It is possible to transfer the current to the coils 111 installed on the lens barrel 110 via the film suspension 150.

Figure 5:
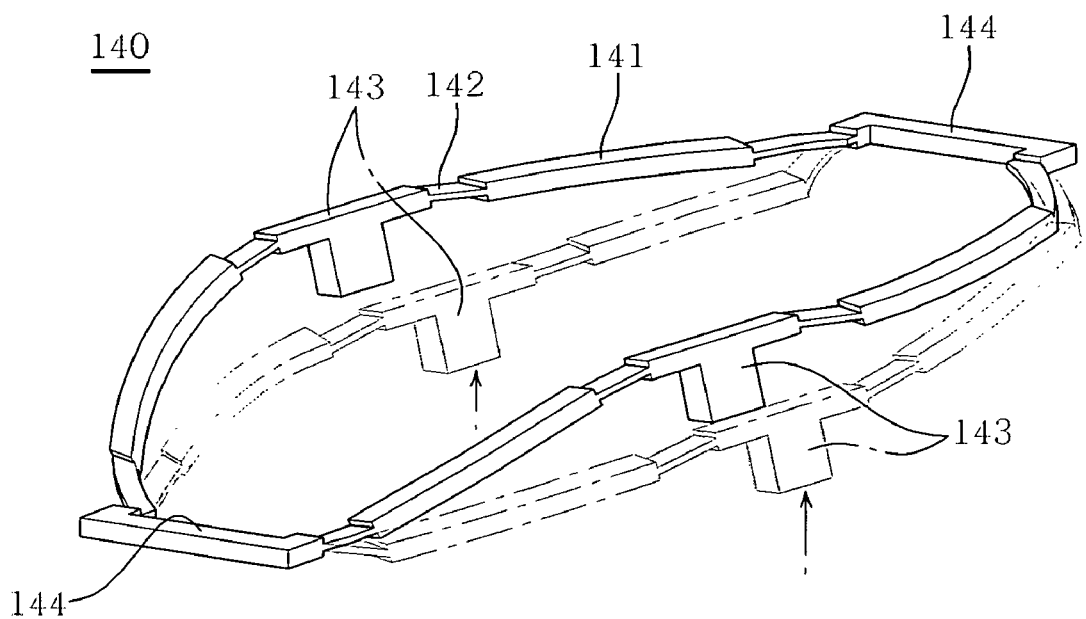
FIG. 5 is a schematic perspective view illustrating the hinge spring of FIG. 1.
Figure 6:
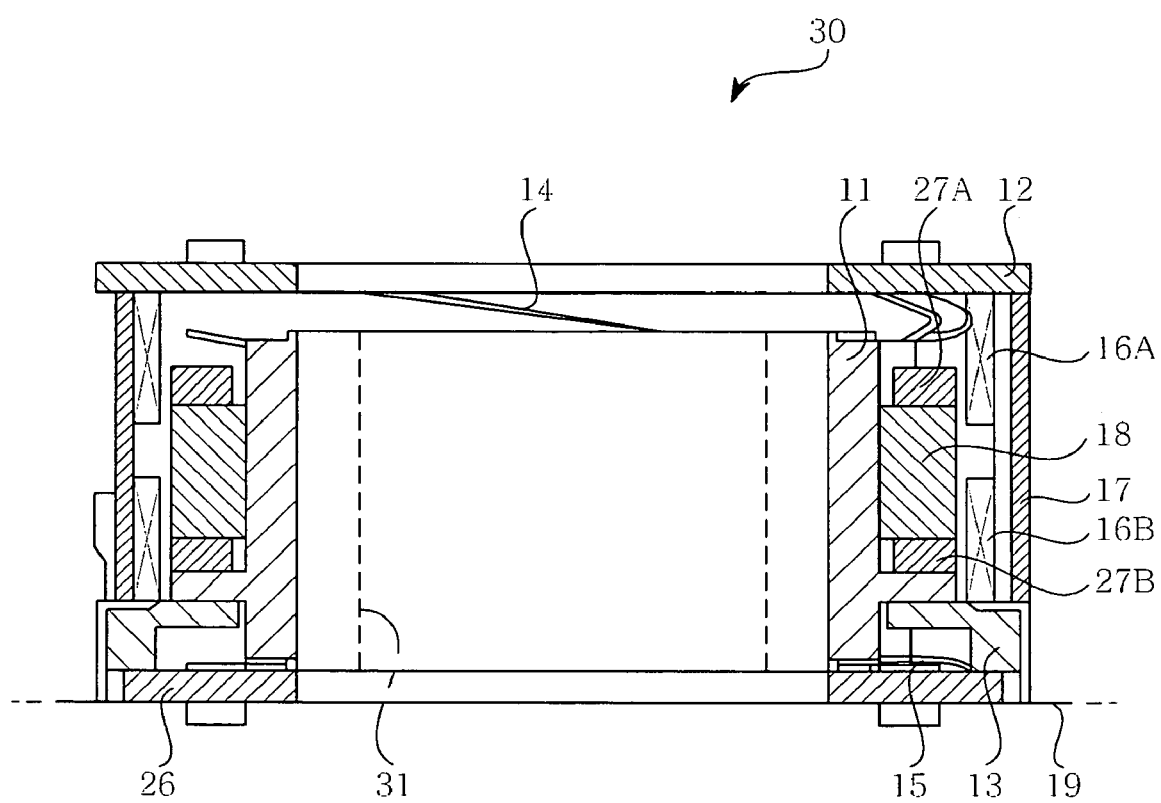
FIG. 6 is a schematic cross-sectional view illustrating a camera module according to a related art.
Figure 7:
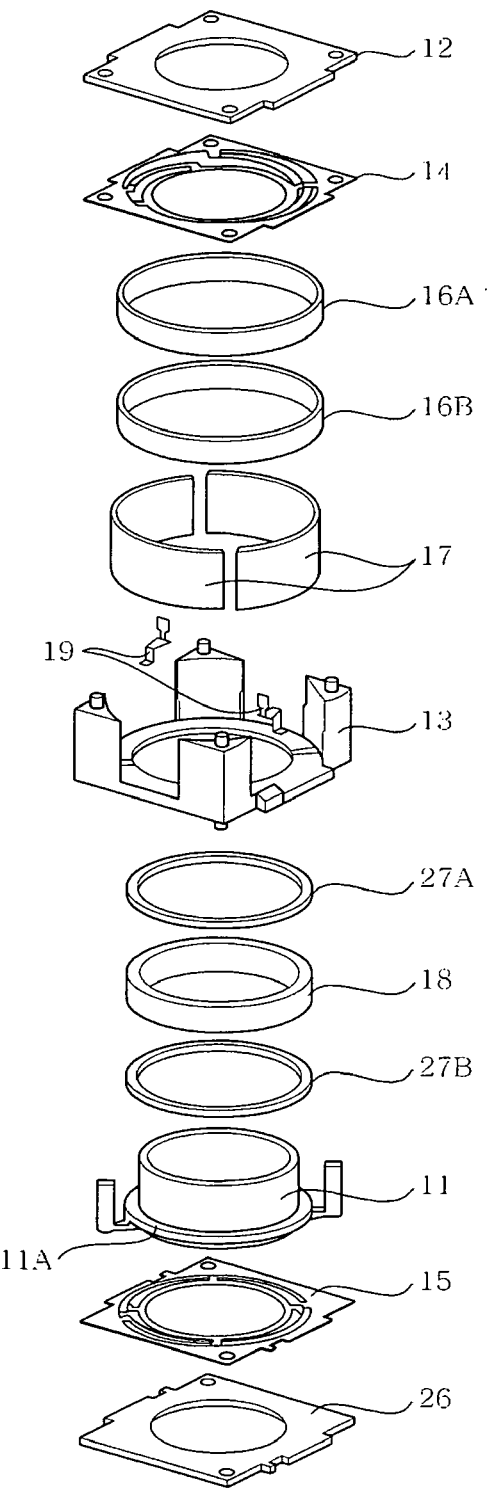
FIG. 7 is an exploded perspective view illustrating the camera module of FIG. 7.

The hinge springs 140 having the aforementioned structure are installed at both sides of the lens barrel 110, respectively and guide the vertical linear motion of the lens barrel 110. As shown in FIG. 5, when the lens barrel 100 vertically moves, the elastically deformable portions 142 of the hinge springs 140 deform and therefore the hinge springs 140 can guide stable linear motion of the lens barrel 110.

That is, during the movement of the lens barrel 110, the frame portions 141 just slightly deform, but the elastically deformable portions 142 connected between the frame portions 141 severely deform in a flexural or twisting manner, guiding the motion of the lens barrel 110.

The hinge springs 140 having the aforementioned structure can be produced in mass volumes at a time through an extrusion molding process using resin having predetermined elasticity. Accordingly, it is possible to decrease time and the number of manufacturing processes in comparison with the conventional leaf spring. Further, with the use of the lightweight resin-based hinge springs 140 instead of the metal-based leaf springs, it is possible to realize the lightweight camera module 100.

In the camera module 100 according to the embodiment, the coils 111 and the permanent magnets 121 are used as an automatic focusing actuator to drive the lens barrel 110 in a vertical direction for focusing of the lenses. However, alternatively, a piezo actuator, which moves the lens barrel 110 by vibration attributable to the input current, can also be used as the automatic focusing actuator.

The camera module of the invention is described with reference to the preferred embodiment of the invention, but it is apparent that people ordinarily skilled in the art can practice a variety of alterations and modifications and can perform the equivalent of the embodiments within the scope of the claims.

What is claimed is:

1. A camera module comprising:
   a cylindrical lens barrel comprising a plurality of lenses to gather an image of an external object;
   a housing which encases the lens barrel in a manner such that the lens barrel vertically moves in an optical axis direction of the lenses;
   an automatic focusing actuator installed in the housing to linearly drive the lens barrel in the optical axis direction; and
   a ring-shaped hinge spring extrusion-molded with resin, having an elasticity to support an upper portion of the lens barrel and to guide the motion of the lens barrel in the optical axis direction; and
   a film suspension at a lower portion of the lens barrel to guide the movement of the lens barrel in the optical axis direction.

2. The camera module according to claim 1, wherein the hinge spring has an elastically deformable portion which is relatively thin in comparison with other portions of the hinge spring so that the elastically deformable portion can elastically deform when the lens barrel moves in the optical axis direction.

3. The camera module according to claim 2, wherein the hinge spring comprises:
   a plurality of frame portions arranged in a ring shape;
   two barrel-coupling portions to couple the hinge spring to the lens barrel;
   two housing-coupling portions to couple the hinge spring to the housing; and
   an elastically deformable portion to couple each of the frame portions to the barrel-coupling portions or the housing-coupling portions, wherein the elastically deformable portion is thinner than the frame portions so as to deform when the lens barrel moves in the optical axis direction.

4. The camera module according to claim 3, wherein the barrel-coupling portions comprise protrusions which are integrally formed with the barrel-coupling portions and inserted into the lens barrel so as to be fixed in the lens barrel.

5. The camera module according to claim 4, wherein the lens barrel has two coupling protrusions disposed apart from each other on an outer surface of the lens barrel to form grooves into which protrusions of the housing are inserted.

6. The camera module according to claim 5, wherein the barrel coupling portions coupled to the lens barrel move in a direction which is parallel to the optical axis direction when the lens barrel moves in the optical axis direction, and the elastically deformable portions couple the barrel-coupling portions to the frame portions deform in a flexural or twisting manner.

7. The camera module according to claim 1, wherein the hinge spring comprises:
   a plurality of frame portions arranged in a ring shape;
   two barrel-coupling portions to couple the hinge spring to the lens barrel;
   two housing-coupling portions to couple the hinge spring to the housing; and
   an elastically deformable portion to couple each of the frame portions to the barrel-coupling portions or the housing-coupling portions, wherein the elastically deformable portion is thinner than the frame portions so as to deform when the lens barrel moves in the optical axis direction.

8. The camera module according to claim 7, wherein the barrel-coupling portions comprise protrusions which are integrally formed with the barrel-coupling portions and inserted into the lens barrel so as to be fixed in the lens barrel.

9. The camera module according to claim 8, wherein the lens barrel has two coupling protrusions disposed apart from each other on an outer surface of the lens barrel to form grooves into which protrusions of the housing are inserted.

10. The camera module according to claim 9, wherein the barrel coupling portions coupled to the lens barrel move in a direction that is parallel to the optical axis direction when the lens barrel moves in the optical axis direction, and the elastically deformable portions couple the barrel-coupling portions to the frame portions deform in a flexural or twisting manner.

* * * * *

UNITED STATES PATENT AND TRADEMARK OFFICE
CERTIFICATE OF CORRECTION

PATENT NO. : 7,978,421 B2  Page 1 of 1
APPLICATION NO. : 12/385457
DATED : July 12, 2011
INVENTOR(S) : Jang Young Im et al.

It is certified that error appears in the above-identified patent and that said Letters Patent is hereby corrected as shown below:

IN THE CLAIMS:

Column 5, Line 34, In Claim 1, after "barrel" delete "vertically".

Signed and Sealed this
Thirteenth Day of September, 2011

David J. Kappos
*Director of the United States Patent and Trademark Office*